3,754,058
O-PHENYL-S-ALKYL-N-ALKYL-PHOSPHORO-
AMIDE-THIOLATES
Shigeo Kishino and Yasuo Yamada, Tokyo, and Akio
Kudamatsu, Kawasaki, Shozo Sumi, Tokyo, and Kozo
Shiokawa, Kawasaki, Japan, assignors to Nihon Toku-
shu Noyaku Seizo Kabushiki Kaisha, Tokyo, Japan
No Drawing. Filed Oct. 26, 1970, Ser. No. 84,198
Claims priority, application Japan, Oct. 27, 1969,
44/85,283
Int. Cl. A01n 9/36; C07f 9/16
U.S. Cl. 260—949
14 Claims

ABSTRACT OF THE DISCLOSURE

O-phenyl-S-alkyl-N-alkyl-phosphoroamido-thiolates, i.e. O-[(optionally mono nitro, phenyl and alkylmercapto or optionally mono nitro, phenyl or alkylmercapto and mono to tri halogen or alkyl-substituted)-phenyl] - S - (alkyl, alkenyl, haloalkyl and phenylalkyl)-N-(alkyl and cycloakyl) - phosphoroamido - thiolates or -amido-thiolphosphoric acid esters, which possess insecticidal, acaricidal and nematocidal properties and which may be produced by conventional methods.

O-phenyl-S-alkyl-N-alkyl(or cycloalkyl)-phosphoro-amidothiolates and process for the production thereof The present invention relates to new O-phenyl-S-alkyl-N-alkyl(or cycloalkyl)-phosphoroamido-thiolates, which possess insecticidal, acaricidal and nematocidal properties and to the production thereof.

The new phosphoroamido-thiolates, according to the present invention, are compounds of the general formula:

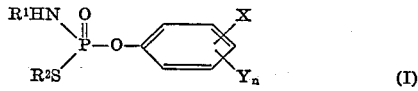

(I)

wherein

R¹ is alkyl of 1 to 6 carbon atoms or cycloalkyl of 5 to 6 ring carbon atoms,

R² is alkyl of 1 to 6 carbon atoms, alkenyl of 2 to 6 carbon atoms, haloalkyl of 1 to 6 carbon atoms or aralkyl of 7 to 10 carbon atoms, X is nitro, phenyl or alkylmercapto of 1 to 4 carbon atoms, Y is hydrogen, halogen or alkyl of 1 to 4 carbon atoms, and n is a whole number from 1 to 4.

It has now been found, in accordance with the present invention, that the new compounds of the aforementioned Formula I possess insecticidal, acaricidal and nematocidal properties.

The active compounds according to the present invention exhibit a remarkably good insecticidal, acaricidal and nematocidal effect against various kinds of harmful insect, mite and nematode pests. These compounds have low toxicity to warm-blooded animals and are applicable to cultivated plants because they do not cause phytotoxicity to cultivated plants at the concentration used. Therefore, they can be used as plant protection agents for the control of various harmful insect pests of a wide range, such as harmful sucking insects, biting insects and diptera, as well as harmful mite and nematode pests of plants and elsewhere.

The compounds of the present invention are effective against agricultural pests of the most wildly varied classes. As harmful insect pests Coleoptera such as *Sitophilus oryzae* (small rice weevil), *Tribolium castaneum* (rust-red flour beetle), *Epilachna vigintioctopunctata* (28-spotted lady beetle), *Agriotes fuscicollis* (barley wireworm) and *Anomala refocuprea* (soy bean bettle), Lepidoptera such as *lymantria dispar* (gypsy moth), *Malacosoma neustria testacea* (tent caterpillar), *Pieris rapae crucivora* (common cabbage worm). *Prodenia litura* (tobacco cutworm), *Chilo suppressalis* (rice stem borer), *Adoxophyes orana* (smaller tea tortrix) and *Ephestia cautella* (almond moth), Aphidae such as *Nephotettix cincticeps* (green rice leafhopper), *Nilarvata lugens* (brown planthopper), *Pseudococcus comstocki* (comstock mealybug), *Unaspis yanonensis* (arrowhead scal), *Mysus persicae* (green peach aphid), *Aphis pomi* (apple aphid) and *Brevicoryne brassicae* (cabbage aphid), Orthoptera such as *Blatella germanica* (german cockroach), *Periplaneta americana* (american cockroach) and *Gryllotalpa africana* (african mole cricket), Isoptera such as *Leucotermes speratus* (Japanese termite), Diptera such as *Musca vicina* (house fly), *Aedes aegypti* (yellow-fever mosquito), *Anopheles sinensis* (malaria mosquito), *Culex pipiens* (northern house mosquito), *Culex tritaeniorhynchus* (Japanese encephalitis mosquito) and *Hylemia platura* (seed-corn maggot) may be mentioned.

As harmful mite pests Acarina such as *Tetranychus telarius* (carmine mite), *Panonychus citri* (citrus red mite) and *Aculus pelekassi* (Japanese citrus rust mite) may be mentioned.

As harmful nematode pests Nematodes such as *Meloidogyme incognita* var. acrita (root knot nematode disease), *Aphelenchoides besseyi* (white tip) and *Meloidogyne hapla* (root know nematode disease) may be mentioned.

According to the excellent pesticidal properties as stated above, the active compounds according to the present invention can be used with good results for the control of agricultural and horticultural harmful pests belonging to insects, acarina and nematodes, causing damage by living in the soil, especially for the control of rice stem borer, leaf- and plant-hoppers cutworms, common cabbage worms, spider mites, aphids, fruit moths, leaf rollers, scales, and gypsy moths.

The active compounds according to the present invention can also be used with good result against insect, mite and nematode pests which are controlled by similar chemical compounds.

As stated above, the compounds according to the present invention exhibit excellent controlling effect against various harmful insect, mite and nematode pests of a wide range which attack rice plants and other cultured plants, and, therefore, these compounds are practically used in economizing labor required for the agricultural and horticultural production.

Furthermore, they can be used with good results for the control of hygienic and storage harmful insect pests, especially for the control of flies, cockroaches, mosquitos and gnats.

Furthermore, as these compounds do not contain a heavy metal harmful to men and cattle as do organic mercury compounds, they are free from hazards caused by residual toxicity in harvested crops, and they are extremely advantageous when used as agricultural chemicals as they are less toxic, not showing strong acute toxicity to men and cattle as Parathion does.

It has been furthermore found, in accordance with the present invention, that the compound of Formula I above may be produced by the process which is shown by the following reaction scheme:

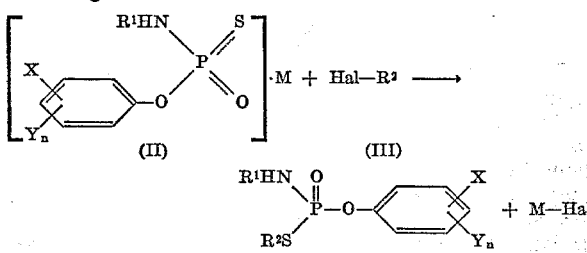

wherein $R^1$, $R^2$, X, Y and n are the same as defined in the general Formula I, M is metal atom or ammonium radical, and Hal is halogen atom.

$R^1$ represents alkyl of 1 to 6 carbon atoms or cycloalkyl of 5 to 6 ring carbon atoms such as methyl, ethyl, n- or iso-propyl, n-, iso-, sec.- or tert.-butyl, n- and iso-amyl, n-, iso-, or sec.-hexyl, 1,1,2-trimethylpropyl, 2,3-dimethyl butyl, cyclopentyl and cyclohexyl, and the like, especially methyl, ethyl, n- or i-propyl, n- or sec.- butyl, n-hexyl and cyclohexyl.

$R^2$ represents alkyl of 1 to 6 carbon atoms stated above, alkenyl of 2 to 6 carbon atoms such as allyl, propenyl, and methallyl, especially allyl, haloalkyl of 1 to 6 carbon atoms such as chloroethyl, chloro-n-propyl, (1-chloromethyl) ethyl, (1-chloromethyl-2-chloro) ethyl, and 3-chlorobutyl, especially chloroethyl, aralkyl of 7 to 10 carbon atoms such as benzyl and β-phenylethyl, and the like, especially benzyl and β-phenylethyl.

X represents nitro, phenyl and lower alkylmercapto of 1 to 4 carbon atoms such as methylmercapto, ethyl mercapto, n- or iso-propylmercapto, and n-, iso-, sec.- or tert.- or tert.-butylmercapto and the like, especially nitro, phenyl, methylmercapto or ethylmercapto.

Y reprsents hydrogen, halogen such as chloro, bromo, fluoro and iodo, especially chloro or lower alkyl of 1 to 4 carbon atoms such as methyl, ethyl, n- or iso-propyl, n-, iso-, sec.- or tert.-butyl, especially methyl.

n represents a whole number from 1 to 4, especially 1 to 2.

M represents a metal atom such as sodium, potassium, lithium or ammonium, especially sodium, potassium or ammonium radical.

Hal represents of O-substituted phenyl-N-alkyl amidothiophosphoric acid salts of Formula II above, which may be used as starting materials, the following are mentioned:

N-methyl-O-(4-methylthiophenyl)-,
N-ethyl-O-(4-methylthiophenyl)-,
N-isopropyl-O-(4-methylthiophenyl)-,
N-n-propyl-O-(4-methylthiophenyl)-,
N-sec.-butyl-O-(4-methylthiophenyl)-,
N-methyl-O-(3-methyl-4-methylthiophenyl)-,
N-iso-propyl-O-(2-methyl-4-methylthiophenyl)-,
N-iso-propyl-O-(3-methyl-4-methylthiophenyl)-,
N-sec.-butyl-O-(2-methyl-4-methylthiophenyl)-,
N-sec.-butyl-O-(3-methyl-4-methylthiophenyl)-,
N-iso-propyl-O-(3,5-dimethyl-4-methylthiophenyl)-,
N-sec.-butyl-O-(3,5-dimethyl-4-methylthiophenyl)-,
N-iso-propyl-O-(2-chloro-4-methylthiophenyl)-,
N-sec.-butyl-O-(2-chloro-4-methylthiophenyl)-,
N-iso-propyl-O-(3-chloro-4-methylthiophenyl)-,
N-iso-propyl-O-(4-ethylthiophenyl)-,
N-methyl-O-(4-nitrophenyl)-,
N-cyclohexyl-O-(4-methylthiophenyl)-,
N-iso-propyl-O-(4-nitrophenyl)-,
N-ethyl-O-(4-nitrophenyl)-,
N-n-propyl-O-(4-nitrophenyl)-,
N-sec.-butyl-O-(4-nitrophenyl)-,
N-iso-propyl-O-(2-nitrophenyl)-,
N-sec.-butyl-O-(2-nitrophenyl)-,
N-iso-propyl-O-(3-nitrophenyl)-,
N-iso-propyl-O-(3-methyl-4-nitrophenyl)-,
N-sec.-butyl-O-(3-methyl-4-nitrophenyl)-,
N-iso-propyl-O-(2-chloro-4-nitrophenyl)-,
N-iso-propyl-O-(3-chloro-4-nitrophenyl)-,
N-iso-propyl-O-(2-nitro-4-chloro-phenyl)-,
N-sec.-butyl-O-(2-nitro-4-chloro-phenyl)-,
N-methyl-O-(2-nitro-4-methylphenyl)-,
N-iso-propyl-O-(2-nitro-4-methylphenyl)-,
N-sec.-butyl-O-(2-nitro-4-methylphenyl)-,
N-methyl-O-(4-phenylphenyl)-,
N-ethyl-O-(4-phenylphenyl)-,
N-iso-propyl-O-(4-phenylphenyl)-,
N-sec.-butyl-O-(4-phenylphenyl)-,
N-methyl-O-(2-phenylphenyl)-,
N-iso-propyl-O-(2-phenylphenyl)-,
N-sec.-butyl-O-(2-phenylphenyl)-amidothiophosphoric acid potassium (or ammonium) salts, and the like.

As examples of alkyl halides or aralkyl halides of the Formula III above, which may be used as starting materials, the following are mentioned:

methyl-, or ethyl-,
chloroethyl-,
n- or iso-propyl-,
n- or sec.-butyl-,
n-hexyl-,
allyl-,
benzyl-,
β-phenylethyl-bromide or iodide, and the like.

The process is preferably carried out in the presence of water and/or inert organic solvent which term includes a mere diluent, but can also be carried out by directly reacting the starting materials.

Examples of such solvent include, aliphatic or aromatic hydrocarbons (which may be halogenated), for example, benzene, methylenechloride, chloroform, carbontetrachloride, benzene, chlorobenzene, toluene, or xylene; ethers, for example, diethylether, dibutylether, dioxane and tetrahydrofuran; and aliphatic alcohols with lower boiling point, for example, methanol, ethanol, isopropanol; ketones, for example, acetone, methyl ethyl ketone, methyl isopropyl ketone or methyl isobutyl ketone, and the like. Lower aliphatic nitriles, for example, acetonitrile, propionitrile and the like, may also be used.

The production reacting according to the present invention may be carried out within a fairly wide temperature range, but in general at temperatures substantially between about 0–100° C., preferably between about 30–80° C.

The starting materials of the Formula II above, are produced by the conventional methods. For example, O-substituted phenyl - N - alkylamidothionophosphoryl chloride is reacted with an alkali substance. The obtained O-substituted phenyl - N - alkyl - amidothiophosphoric acid salt is reacted after isolation or reacted continuously with halides, such as alkyl-, alkenyl-, haloalkyl- or aralkyl-halides without isolation, and the product of the Formula I above can be obtained.

The following examples illustrate, without limitation, the process for producing the new compounds of the present invention.

EXAMPLE 1

Synthesis of starting substance

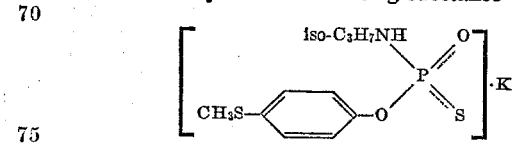

29 g. of potassium hydroxide were dissolved in 200 ml. of water, and 200 ml. of dioxane were added. While stirring violently, to the solution, 74 g. of O-(4-methyl-thio-phenyl) - N - isopropylamidothionophosphoric acid chloride were added dropwise at 40–50° C. After the completion of dropwise addition, the mixture was further stirred at 60° C. for one hour. Distilling off the dioxane and water under reduced pressure and dissolving the residue again in water, the solution was shaken after benzene was added. The water layer of the mixture was concentrated under reduced pressure, and the residue was dissolved in acetone, and inorganic salt was separated with filtration. When the acetone was distilled off, 69 g. of O-(4-methylthio-phenyl) - N - isopropylamidothionophosphoric acid potassium salt were obtained.

EXAMPLE 2

Synthesis of O-(4-methylthio-phenyl)-S-n-butyl-N-isopropyl-phosphoro-amido-thiolate

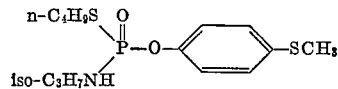

32 g. of potassium salts obtained by the process of Example 1 were dissolved in 100 ml. of alcohol and 14 g. of n-butylbromide were added dropwise at 40° C. After the mixture was stirred at 70–80° C. for 3 hours and cooled, the inorganic salt was separated by filtration. The alcohol was distilled off from the filtrate and the residue was dissolved in benzene and washed with aqueous solution of 1% sodium carbonate. After the solution was dried by anhydrous sodium sulphate and the benzene was distilled off, the residue was recrystallized from n-hexane-benzene solution to yield 29 g. of O-(4-methyl-thiophenyl)-S-n-butyl - N - isopropyl-phosphoro-amido-thiolate, a white crystal of M.P. 70–71° C.

EXAMPLE 3

Synthesis of O-(2-phenyl-phenyl)-S-n-propyl-N-isopropyl-phosphoro-amido-thiolate

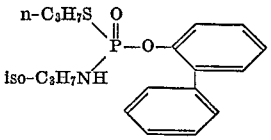

14. g. of potassium hydroxide were dissolved in 50 ml. of water, and 150 ml. of dioxane were added. While stirring at 40° C., 40 g. of O-(2-phenyl-phenyl)-N-isopropylamidothionophosphoric acid chloride were added dropwise to the solution. After the mixture was further stirred at 60° C. for 1 hours, 15 g. of n-propylbromide was added dropwise and the mixture was stirred at 70–80° C. for 4 hours. After the dioxane was distilled off, the residue was dissolved in benzene and washed with aqueous solution of 1% sodium carbonate. After the mixture was dried by anhydrous sodium sulphate, the benzene was distilled off and the residue was recrystallized with n-hexane-benzene mixed solution to yield 35 g. of O-(2-phenyl-phenyl) - S - n - propyl-N-isopropyl-phosphoro-amido-thiolate, a white crystal of M.P. 74–76° C.

The other typical compounds of the present invention which are prepared in analogous manner in Examples 1 to 3 are listed in Table 1 below.

TABLE 1

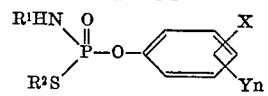

| Compound number | R¹ | R² | X | Yn | Boiling point, °C./mm. Hg | $n_D^{20}$ | Melting point, °C. |
|---|---|---|---|---|---|---|---|
| 1 | $CH_3$ | $CH_3$ | 4-$CH_3$S | H | 182–188/0.08 | 1.5964 | |
| 2 | $CH_3$ | $C_2H_5$ | 4-$CH_3$S | H | 188–191/0.1 | 1.5870 | |
| 3 | $CH_3$ | $C_3H_7$-n | 4-$CH_3$S | H | 172–173/0.04 | 1.5788 | |
| 4 | $CH_3$ | $C_4H_9$-n | 4-$CH_3$S | H | 180–183/0.06 | 1.5712 | |
| 5 | $CH_3$ | $C_6H_{13}$-n | 4-$CH_3$S | H | 199–207/0.1 | 1.5561 | |
| 6 | $C_3H_7$-iso | $CH_3$ | 4-$CH_3$S | H | | | 102–103 |
| 7 | $C_3H_7$-iso | $C_2H_5$ | 4-$CH_3$S | H | | | 85–86 |
| 8 | $C_3H_7$-iso | $C_3H_7$-n | 4-$CH_3$S | H | | | 83–85 |
| 9 | $C_3H_7$-iso | $C_4H_9$-n | 4-$CH_3$S | H | | | 70–71 |
| 10 | $C_3H_7$-iso | $C_6H_{13}$-n | 4-$CH_3$S | H | | | 69–70 |
| 11 | $C_3H_7$-iso | $C_4H_9$-sec | 4-$CH_3$S | H | | | 86–88 |
| 12 | $C_3H_7$-iso | $CH_2CH_2$-⌬ | 4-$CH_3$S | H | | | 95–97 |
| 13 | $C_4H_9$-sec | $C_3H_7$-n | 4-$CH_3$S | H | | | 70–72 |
| 14 | $C_4H_9$-sec | $C_4H_9$-n | 4-$CH_3$S | H | | | 58–60 |
| 15 | $CH_3$ | $C_2H_5$ | 4-$CH_3$S | 3-$CH_3$ | 184–187/0.2 | | 42–44 |
| 16 | $CH_3$ | $C_3H_7$-n | 4-$CH_3$S | 3-$CH_3$ | 188–194/0.1 | | 57–59 |
| 17 | $CH_3$ | $C_4H_9$-n | 4-$CH_3$S | 3-$CH_3$ | 190–192/0.15 | | 56–57 |
| 18 | $CH_3$ | $C_6H_{13}$-n | 4-$CH_3$S | 3-$CH_3$ | 199–207/0.15 | | 55–56 |
| 19 | $CH_3$ | $C_4H_9$-sec | 4-$CH_3$S | 3-$CH_3$ | 183–189/0.2 | 1.5709 | |
| 20 | $CH_3$ | —$CH_2CH=CH_2$ | 4-$CH_3$S | 3-$CH_3$ | 188–190/0.2 | 1.5888 | |
| 21 | $CH_3$ | —$CH_2$-⌬ | 4-$CH_3$S | 3-$CH_3$ | | | 72–74 |
| 22 | $C_3H_7$-iso | $C_2H_5$ | 4-$CH_3$S | 3-$CH_3$ | | | 86–87 |
| 23 | $C_3H_7$-iso | $C_3H_7$-n | 4-$CH_3$S | 3-$CH_3$ | | | 74–75 |
| 24 | $C_3H_7$-iso | $C_4H_9$-n | 4-$CH_3$S | 3-$CH_3$ | | | 71–72 |
| 25 | $C_4H_9$-sec | $C_3H_7$-n | 4-$CH_3$S | 3-$CH_3$ | | | 66–68 |
| 26 | $C_4H_9$-sec | $C_4H_9$-n | 4-$CH_3$S | 3-$CH_3$ | | | 57–58 |
| 27 | $C_3H_7$-iso | $C_3H_7$-n | 4-$CH_3$S | 2-$CH_3$ | | | 63–64 |
| 28 | $C_3H_7$-iso | $C_4H_9$-n | 4-$CH_3$S | 2-$CH_3$ | | | 69–71 |
| 29 | $C_4H_9$-sec | $C_3H_7$-n | 4-$CH_3$S | 2-$CH_3$ | | | 67–69 |
| 30 | $C_4H_9$-sec | $C_4H_9$-n | 4-$CH_3$S | 2-$CH_3$ | | | 68–69 |
| 31 | $CH_3$ | $C_3H_7$-n | 4-$CH_3$S | 3,5-$(CH_3)_2$ | | | 75–76 |
| 32 | $CH_3$ | $C_4H_9$-n | 4-$CH_3$S | 3,5-$(CH_3)_2$ | | | 76–5–78 |
| 33 | $C_3H_7$-iso | $C_3H_7$-n | 4-$CH_3$S | 3,5-$(CH_3)_2$ | | | 58–59 |
| 34 | $C_3H_7$-iso | $C_4H_9$-n | 4-$CH_3$S | 3,5-$(CH_3)_2$ | | | 63–64.5 |
| 35 | $C_4H_9$-sec | $C_3H_7$-n | 4-$CH_3$S | 3,5-$(CH_3)_2$ | | | |
| 36 | $C_4H_9$-sec | $C_4H_9$-n | 4-$CH_3$S | 3,5-$(CH_3)_2$ | | | |
| 37 | $C_3H_7$-iso | $C_3H_7$-n | 4-$CH_3$S | 2-Cl | | 1.5478 | |
| 38 | $C_3H_7$-iso | $C_4H_9$-n | 4-$CH_3$S | 2-Cl | | | |
| 39 | $C_4H_9$-sec | $C_3H_7$-n | 4-$CH_3$S | 2-Cl | | 1.5379 | |
| 40 | $C_4H_9$-sec | $C_4H_9$-n | 4-$CH_3$S | 2-Cl | | | |
| 41 | $C_3H_7$-iso | $C_3H_7$-n | 4-$C_2H_5$S | H | | | |
| 42 | $C_3H_7$-iso | $C_4H_9$-n | 4-$C_2H_5$S | H | | | |

TABLE 1—Continued

| Compound number | R¹ | R² | X | Yn | Boiling point, °C./mm. Hg | $n_D^{20}$ | Melting point, °C. |
|---|---|---|---|---|---|---|---|
| 43 | CH₃ | CH₃ | 4-NO₂ | H | | | 94–96 |
| 44 | CH₃ | C₂H₅ | 4-NO₂ | H | 187–192/0.1 | 1.5743 | |
| 45 | CH₃ | C₃H₇-n | 4-NO₂ | H | 199–204/0.18 | 1.5650 | |
| 46 | CH₃ | C₄H₉-n | 4-NO₂ | H | 195–199/0.13 | 1.5597 | |
| 47 | C₃H₇-iso | CH₃ | 4-NO₂ | H | | | 90–92 |
| 48 | C₃H₇-iso | C₂H₅ | 4-NO₂ | H | | | 71–72 |
| 49 | C₃H₇-iso | C₃H₇-n | 4-NO₂ | H | | | 54–55 |
| 50 | C₃H₇-iso | C₄H₉-n | 4-NO₂ | H | | | 46–48 |
| 51 | C₃H₇-iso | C₆H₁₃-n | 4-NO₂ | H | 190–194/0.15 | 1.5364 | |
| 52 | C₄H₉-sec | C₃H₇-n | 4-NO₂ | H | 182–185/0.15 | | 58–60 |
| 53 | C₄H₉-sec | C₄H₉-n | 4-NO₂ | H | 183–187/0.15 | | 40–41 |
| 54 | C₃H₇-iso | C₃H₇-n | 4-NO₂ | 3-CH₃ | | | |
| 55 | C₃H₇-iso | C₄H₉-n | 4-NO₂ | 3-CH₃ | | | |
| 56 | C₃H₇-iso | C₃H₇-n | 4-NO₂ | 2-Cl | | | |
| 57 | C₃H₇-iso | C₄H₉-n | 4-NO₂ | 2-Cl | | | |
| 58 | C₃H₇-iso | C₄H₉-n | 3-NO₂ | H | 175–180/0.1 | | 58–60 |
| 59 | CH₃ | CH₃ | 2-NO₂ | H | | | 88–91 |
| 60 | CH₃ | C₃H₇-n | 2-NO₂ | H | 188–192/0.1 | 1.5558 | |
| 61 | CH₃ | C₄H₉-n | 2-NO₂ | H | 189–193/0.1 | 1.5498 | |
| 62 | C₃H₇-iso | C₃H₇-n | 2-NO₂ | H | | | |
| 63 | C₃H₇-iso | C₄H₉-n | 2-NO₂ | H | 168–170/0.2 | 1.5401 | |
| 64 | CH₃ | CH₃ | 2-NO₂ | 4-CH₃ | 179–186/0.1 | 1.5683 | |
| 65 | CH₃ | C₃H₇-n | 2-NO₂ | 4-CH₃ | 175–182/0.05 | 1.5548 | |
| 66 | CH₃ | C₄H₉-n | 2-NO₂ | 4-CH₃ | 175–179/0.05 | 1.5477 | |
| 67 | C₃H₇-iso | CH₃ | 2-NO₂ | 4-CH₃ | | | 82–84 |
| 68 | C₃H₇-iso | C₂H₅ | 2-NO₂ | 4-CH₃ | | | 73–75 |
| 69 | C₃H₇-iso | C₃H₇-n | 2-NO₂ | 4-CH₃ | | | 70–71 |
| 70 | C₃H₇-iso | C₄H₉-n | 2-NO₂ | 4-CH₃ | | | 65–66 |
| 71 | C₃H₇-iso | C₂H₅ | 2-NO₂ | 4-Cl | 163–164/0.15 | | |
| 72 | C₃H₇-iso | C₄H₉-n | 2-NO₂ | 4-Cl | 178/0.1 | | 57–58 |
| 73 | CH₃ | CH₃ | 4-Ph | H | | | 100–104 |
| 74 | CH₃ | C₂H₅ | 4-Ph | H | | | 98–100 |
| 75 | CH₃ | C₃H₇-n | 4-Ph | H | 208–212/0.08 | | 57–58 |
| 76 | CH₃ | C₄H₉-n | 4-Ph | H | | | 58–60 |
| 77 | C₂H₅ | C₃H₇-n | 4-Ph | H | | | 93–95 |
| 78 | C₂H₅ | C₄H₉-n | 4-Ph | H | | | 80–81 |
| 79 | C₃H₇-iso | C₂H₅ | 4-Ph | H | | | 122–124 |
| 80 | C₃H₇-iso | C₃H₇-n | 4-Ph | H | | | 85–86 |
| 81 | C₃H₇-iso | C₄H₉-n | 4-Ph | H | | | 88–91 |
| 82 | CH₃ | CH₃ | 2-Ph | H | | | 104–106 |
| 83 | CH₃ | C₂H₅ | 2-Ph | H | | | 94–96 |
| 84 | CH₃ | C₃H₇-n | 2-Ph | H | 181–188/0.05 | 1.5895 | |
| 85 | CH₃ | C₄H₉-n | 2-Ph | H | 184–188/0.08 | 1.5820 | |
| 86 | CH₃ | C₆H₁₃-n | 2-Ph | H | 173–179/0.2 | 1.5669 | |
| 87 | C₂H₅ | C₃H₇-n | 2-Ph | H | | | 95–97 |
| 88 | C₂H₅ | C₄H₉-n | 2-Ph | H | | | 73–75 |
| 89 | C₃H₇-iso | C₂H₅ | 2-Ph | H | | | 81–83 |
| 90 | C₃H₇-iso | C₃H₇-n | 2-Ph | H | | | 74–76 |
| 91 | C₃H₇-iso | C₄H₉-n | 2-Ph | H | | | 72–74 |
| 92 | C₄H₉-sec | C₃H₇-n | 2-Ph | H | 176–179/0.1 | | 58–60 |
| 93 | C₄H₉-sec | C₄H₉-n | 2-Ph | H | 185–192/0.15 | | 56–58 |
| 94 | C₃H₇-iso | C₂H₄Cl | 4-CH₃S | 3-CH₃ | | 1.5681 | |
| 95 | ⟨C₆H₁₁⟩ | C₄H₉-n | 4-CH₃S | H | | | |

When the compounds of the present invention are used as insecticide, acaricide and nematocide, they are applied after dilution with water directly or they are used, after dilution with water, by use of solvents or adjuvants as cocasion demands, or they are formulated into various types of formulations by mixing with various kinds of inert gaseous, liquid or solid diluents and/or carriers and, as occasion demands, co-using adjuvants such as surface active agents, emulsifying agents, dispersing agents, developers, adhesive agents, etc.; according to the method generally practiced in the field of manufacture of agricultural chemicals.

As gaseous diluents or carriers, Freon or other propellants, gases for aerosol use in normal condition, are employed. As liquid diluents or carriers, water; organic solvents; aromatic hydrocarbons, such as xylene, toluene, benzene, dimethylnaphthalene, aromatic naphthas, etc.; chlorinated aromatic or aliphatic hydrocarbons, such as chlorobenzenes, chloromethylene, chloroethylene, tetracarbon chloride, etc.; aliphatic hydrocarbons, such as benzene, cyclohexane, paraffins, etc.; alcohols, such as methanol, propanol, butanol, etc.; ketones, such as acetone, methylethylketone, cyclohexanone, etc.; strongly polar solvents, such as acetonitrile, dimethyl formamide, dimethyl sulfoxide, etc. can be used. As solid diluents or carriers, ground natural minerals, such as attapulgite, clay, bentonite, chalk, talc, clay, kaoline, montmorillonite, diatomaceous earth, calcium carbonate, etc.; ground synthetic minerals, such as highly dispersed silicic acid, alumina or silicate, etc. can be used.

As examples of emulsifiers, non-ionic and anionic-surfactants, such as polyoxyethylene fatty acid esters, polyoxyethylene fatty alcohol ethers (for example, alkylarylpolyglycolethers), alkylsulfonates and arylsulfonates, and as examples of dispersing agents, such as lignin, sulfite waste liquors, methyl cellulose, etc. can be used. As occasion demands, other agricultural chemicals, such as insecticides, nematocides, fungicides (including antibiotics), herbicides, plant-growth-regulators or fertilizers and accelerating materials of fertilizing activity can also be co-existent.

Commercially marketed composition of the present invention contain 0.1–95%, preferably 0.5–90% by weight of the aforementioned active compound. The amount of the active components contained in the compositions can be appropriately varied according to the types of formulations, and the methods purpose, time and place of application as well as the conditions of outbreak of diseases, etc.

As the types of formulations, besides mixed active compounds as they are, all types of formulations employed in the field of manufacture of agricultural chemicals, such as liquid, emulsion, emulsifiable concentrate, wettable powder, soluble powder, oil, aerosol, paste, fumigant, dust, granule, coating granule, tablet, pellet and other types can be mentioned.

These compositions can be applied by spraying, such as liquid spraying, atomizing, misting, dusting, scattering, watering, by fumigating, by mixing sprinkling, vaporizing, etc. to the insect pest and/or their habitat either directly or by use of apparatus. Further, they can also be applied by the so-called ultra-low-volume spraying method, with which they can contain up to 95% or even 100% by weight of active compound.

In case of actual application, the amount of active compound in the ready-to-use-preparation can be varied in a fairly wide range for the same reasons stated in the types of formulation. Generally, however, they contain 0.005–10% by weight, preferably 0.01–5.0% by weight of active compound. Dosage amount per unit area is generally between about 15–1,000 g., preferably between 40–600 g. per 10 areas as active compound. However, in special cases, it is possible or even necessary sometimes to exceed or be below the aforementioned amount.

The present invention provides a composition containing as an active ingredient, the compounds of Formula I above, and a solid or liquid diluents and/or carriers and further, if necessary, an adjuvant.

Furthermore, the present invention provides a method of combating pests which comprises applying the compound of the Formula I above singly or mixing with a solid or liquid diluents and/or carriers and, further, if necessary, adjuvant to (a) such pests and (b) their habitat.

The following illustrate, without limitation, examples of formulations which may be used in accordance with the present invention.

EXAMPLE 4

Wettable powder 15 parts by weight of Compound No. 3 of the present invention, 80 parts by weight of a mixture of diatomaceous earth and kaolin (1:3) and 5 parts by weight of emulsifier, Runnox (polyoxyethylene-alkyaryl ether, the product of Toho Kagaku Kogyo K.K.) are mixed and crushed to formulate a wettable powder, which is used after being diluted with water.

EXAMPLE 5

Emulsifiable concentrate 30 parts by weight of Compound No. 16 of the present invention, 30 parts by weight of xylene, 30 parts by weight of Kawakasol (aliphatic hydrocarbons with high boiling point, the products of Kawasaki Kasei Kogyo K.K.) and 10 parts by weight of emulsifier Sorpoi (polyoxyethyelne-alkylaryl ether, the product of Toho Kagaku Kogyo K.K.) are mixed and stirred to formulate an emulsifiable concentrate, which is used after being diluted with water.

EXAMPLE 6

Granule

To a mixture consisting of 10 parts by weight of Compound No. 45 of the present invention, 10 parts by weight of bentonite, 78 parts by weight of talc and 2 parts by weight of lignine sulfonate, 25 parts by weight of water are added and the mixture is kneaded. It is finely cut into granules of 20–40 mesh by a granulating machine. The granules are then dried at 40–50° C. to provide a granular formulation.

EXAMPLE 7

Dust 2 parts by weight of Compound No. 75 of the present invention and 98 parts by weight of a mixture of talc and clay (1:3) are mixed and crushed to formulate a dust which is used as it is.

When comparing an active compound of the present invention with the compound having similar chemical structure and the compounds having the similar biological activity known by the literature, the compounds of the present invention of the Formula I above are characterized by the substantial improvement in their effect and extremely low toxicity to warm-blooded animals, and, accordingly, the compounds have a remarkably good practical value. The unexpectedly excellent point and remarkably good effect of the compounds of the present invention are illustrated by the following test example:

EXAMPLE 8

Insecticidal test against tobacco cutworm larvae (*Prodenia litura*)

Solvent: 5 parts by weight of aceton
Emulsifier: 1 part by weight of polyoxyethylene-alkylaryl-ether To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

Leaves of sweet potato were dipped in the diluted preparation of the active compound and then dried and put in a Petri dish of 9 cm. diameter. 10 tobacco cutworm larvae were then placed in the dish. The dish was kept at a temperature of 28° C. 30 test insects were used altogether for each active compound at each concentration.

After 24 hours, the number of dead insects was counted and the mortality rate was calculated as a percentage. 100% means that all insects were killed, 0% means that none of the insects were killed.

The average results obtained are shown in the table below. Table 2: Results of tests against tobacco cutworm larvae (*Prodenia litura*)

| Compound number | Mortality (percent) at the concentration of active ingredient (p.p.m.) of— | | |
| --- | --- | --- | --- |
|  | 1,000 | 300 | 100 |
| 3 | 100 | 100 | 40 |
| 16 | 100 | 100 | 90 |
| 45 | 100 | 80 |  |
| 65 | 100 | 50 |  |
| 75 | 100 | 30 |  |
| 84 | 80 | 20 |  |
| Dipterex (comparison) | 100 | 30 |  |

NOTES:
1. Compound number in the table correspond to those in the Table 1 mentioned above.
2. Dipterex = O,O-dimethyl-2,2,2-trichloro-2-hydroxyethyl phosphonate.

EXAMPLE 9

Controlling effect tests against carmine mite (*Tetranychus telarius*)

50 to 100 mature and infant carmine mites, which are organophosphorous acaricide-resistant, are provided by successive breeding. Such mites are placed on the leaves of kidney bean bushes planted in a vinyl pot of 6 cm. diameter. 2 days later, a diluted solution of the prescribed concentration of the particular active compounds indicated in Table 3 below, respectively, is sprayed thereon in the manner described in Example 8 above. The so-treated pots are then placed in a greenhouse. 10 days later, the controlling effect is evaluated according to the following scale:

3: The proportion of surviving adult and young mites as well as eggs is 0% compared with that of the non-treated group (control).

2: The proportion of surviving adult and young mites as well as eggs is less than 5% compared with that of the non-treated group.

1: The proportion of surviving adult and young mites as well as eggs is 5–50% compared with that of the non-treated group.

0: The proportion of surviving adult and young mites as well as eggs is more than 50% compared with that of the non-treated group.

The results obtained are given in Table 3 below:

TABLE 3.—RESULTS OF TESTS AGAINST CARMINE MITE
(*Tetranychus telarius*)

| Compound number | Mortality (percent) at the concentration of active ingredient (p.p.m.) of— | | |
|---|---|---|---|
| | 1,000 | 300 | 100 |
| 1 | 3 | 3 | 2 |
| 2 | 3 | 3 | 3 |
| 3 | 3 | 3 | 3 |
| 4 | 3 | 3 | 3 |
| 5 | 3 | 3 | 2 |
| 6 | 3 | 3 | 3 |
| 7 | 3 | 3 | 3 |
| 8 | 3 | 3 | 3 |
| 9 | 3 | 3 | 2 |
| 10 | 3 | 3 | 2 |
| 11 | 3 | 3 | 3 |
| 12 | 3 | 3 | 3 |
| 13 | 3 | 3 | 3 |
| 14 | 3 | 3 | 3 |
| 15 | 3 | 3 | 1 |
| 16 | 3 | 3 | 3 |
| 17 | 3 | 3 | 3 |
| 18 | 3 | 3 | 1 |
| 19 | 3 | 3 | 2 |
| 20 | 3 | 3 | 2 |
| 21 | 3 | 3 | 2 |
| 22 | 3 | 3 | 2 |
| 23 | 3 | 3 | 3 |
| 24 | 3 | 3 | 2 |
| 25 | 3 | 3 | 3 |
| 26 | 3 | 3 | 2 |
| 27 | 3 | 3 | 3 |
| 28 | 3 | 3 | 3 |
| 29 | 3 | 3 | 3 |
| 30 | 3 | 3 | 3 |
| 31 | 3 | 3 | 3 |
| 32 | 3 | 3 | 3 |
| 33 | 3 | 3 | 3 |
| 34 | 3 | 3 | 3 |
| 35 | 3 | 3 | 2 |
| 36 | 3 | 3 | 3 |
| 37 | 3 | 3 | 3 |
| 38 | 3 | 3 | 3 |
| 39 | 3 | 3 | 3 |
| 40 | 3 | 3 | 3 |
| 41 | 3 | 3 | 2 |
| 42 | 3 | 2 | 1 |
| 44 | 3 | 3 | 3 |
| 45 | 3 | 3 | 2 |
| 46 | 3 | 3 | 2 |
| 47 | 3 | 2 | — |
| 48 | 3 | 3 | 3 |
| 49 | 3 | 3 | 3 |
| 50 | 3 | 3 | 2 |
| 51 | 3 | 3 | 3 |
| 52 | 3 | 3 | 3 |
| 53 | 3 | 3 | 2 |
| 54 | 3 | 3 | 3 |
| 55 | 3 | 3 | 2 |
| 56 | 3 | 3 | 2 |
| 57 | 3 | 3 | 1 |
| 58 | 3 | 3 | 2 |
| 60 | 3 | 3 | 2 |
| 61 | 3 | 3 | 2 |
| 62 | 3 | 3 | 3 |
| 63 | 3 | 3 | 2 |
| 65 | 3 | 3 | 3 |
| 66 | 3 | 2 | 1 |
| 72 | 3 | 2 | 1 |
| 75 | 3 | 3 | 3 |
| 76 | 3 | 3 | 3 |
| 77 | 3 | 3 | 3 |
| 78 | 3 | 3 | 3 |
| 80 | 2 | 1 | — |
| 84 | 3 | 3 | 3 |
| 85 | 3 | 3 | 3 |
| 86 | 3 | 3 | 2 |
| 87 | 3 | 3 | 3 |
| 88 | 3 | 3 | 3 |
| 89 | 3 | 1 | — |
| 90 | 3 | 3 | 2 |
| 91 | 3 | 3 | 2 |
| 92 | 3 | 3 | 3 |
| 93 | 3 | 3 | 2 |
| 94 | 3 | 3 | 2 |
| 95 | 3 | 3 | 2 |
| Neo-sappiran (comparison) | 3 | 2 | 1 |

NOTE:
1. Compound numbers in the table correspond to those in the Table 1 mentioned above.
2. Neo-sappiran = Parachlorophenylparachlorbenzensulphonate 36%; Bis (parachlorphenoxy) metan 14%.

EXAMPLE 10

Tests against house-fly (*Musca domestica*)

1 ml. of diluted solution of compounds of the present invention at a prescribed concentration was applied to a filter paper placed in a Petri dish of 9 cm. in diameter. Ten female adult house flies (*Musca domestica*) were put in the dish and left in an incubator kept at 28° C. 24 hours later, the number of dead insects was counted, and mortality ratio was calculated.

The results are shown in Table 4.

The diluted solutions of the compounds were prepared by the same method described in Example 8 above.

TABLE 4.—Results of tests against house fly adults (*Musca domestica*)

| Compound Number | Mortality (percent at the concentration of active ingredient of— | | |
|---|---|---|---|
| | 0.1 | 0.01 | 0.001 |
| 1 | 100 | 70 | |
| 2 | 100 | 70 | |
| 3 | 100 | 80 | |
| 4 | 100 | 80 | |
| 16 | 100 | 100 | 10 |
| 17 | 100 | 70 | |
| 31 | 100 | 100 | |
| 32 | 100 | 50 | |
| 43 | 80 | 50 | |
| 44 | 90 | 80 | |
| 45 | 100 | 80 | |
| 46 | 90 | 70 | |
| 47 | 100 | 50 | |
| 80 | 100 | 50 | |
| DDT (comparison) | 100 | 10 | |

NOTE:
1. Compound numbers in the table correspond to those in the Table 1 mentioned above.
2. DDT: Dichlorodiphenyltrichloroethane.

EXAMPLE 11

Test against southern root-knot nematode *Meloidogyne incognita*

3% and 1% dust, prepared by the same method described in example 7, of the compounds of the present invention were put in the soil highly and densely contaminated with southern root-knot nematode, and mixed with the soil evenly. The soil was put in 1/5000 a. pots in which 20–30 seeds of tomato (variety: kurihara tomato) were sown. (The term "1/5000 a. pot" means pot which covers a space of 0.02 m.²)

After 3 weeks, 10 seedlings were picked out and the degree of root-knot parasitic on the roots was investigated according to the root-knot index.

The root-knot indexes have the following meaning:

4. Knots are formed most highly, which correspond to those of untreated plants.

3. Knots are formed highly but less than those of untreated plants.

2. Knots are formed in the middle degree.

1. Knots are formed slightly.

0. No knot is formed, which means a perfect control.

The results are shown in Table 5.

TABLE 5.—Results of tests against southern root-knot nematode (*Meloidogyne incognita*)

| Compound number | Parasitic index at the concentration of active ingredient (p.p.m.) of — | | |
|---|---|---|---|
| | 100 | 30 | 10 |
| 3 | 0 | 0 | 0.1 |
| 4 | 0 | 0.1 | 2.1 |
| 8 | 0 | 0 | 0.2 |
| 9 | 0 | 0 | 1.0 |
| 13 | 0 | 0 | 0.3 |
| 16 | 0 | 0 | 0 |
| 17 | 0 | 0 | 0.1 |
| 23 | 0 | 0 | 0.3 |
| 24 | 0 | 0.2 | 0.8 |
| 31 | 0 | 0 | 0.7 |
| 32 | 0 | 0.3 | 0.9 |
| 37 | 0 | 0 | 0.1 |
| 38 | 0 | 0 | 0.8 |
| 45 | 0 | 0.1 | 1.3 |
| 46 | 0 | 0.8 | 2.3 |
| 49 | 0 | 0.2 | 0.9 |
| 50 | 0 | 0.4 | 1.2 |
| 54 | 0 | 0.2 | 1.1 |
| 55 | 0 | 0.5 | 2.0 |
| Nemacide (comparison) | 0 | 0.1 | 2.0 |

NOTE:
1. Compound Number in the table correspond to those in Table 1 mentioned above.
2. Nemacide = O,O-diethyl-O-2,4-dichlorophenyl phosphorothioate The invention has been described in detail. Its various embodiments and aspects can be summarized as follows:

What is claimed is:

1. Phosphoro-amido-thiolate of the formula

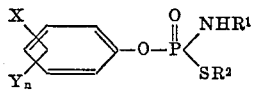

in which R¹ is selected from the group consisting of alkyl of 1 to 6 carbon atoms and cycloalkyl of 5 to 6 ring carbon atoms, R² is selected from the group consisting of alkyl of 1 to 6 carbon atoms, alkenyl of 2 to 6 carbon atoms, halo-alkyl of 1 to 6 carbon atoms, and phenyl-alkyl having 1 to 4 carbon atoms in the alkyl moiety, X is selected from the group consisting of nitro, phenyl, and alkylmercapto of 1 to 4 carbon atoms, Y is selected from the group consisting of hydrogen, halogen, and alkyl of 1 to 4 carbon atoms, and $n$ is a whole number from 1 to 4.

2. The compound of claim 1 wherein R¹ is selected from the group consisting of $C_{1-5}$ alkyl and cyclohexyl, R² is selected from the group consisting of $C_{1-5}$ alkyl, $C_{2-5}$ alkenyl, chloro-$C_{1-5}$ alkyl, benzyl, and phenethyl, X is selected from the group consisting of nitro, phenyl, and $C_{1-3}$ alkylmercapto, Y is selected from the group consisting of hydrogen, halogen, and $C_{1-3}$ alkyl, and $n$ is 1 to 3.

3. The compound of claim 1 wherein R¹ is selected from the group consisting of $C_{1-4}$ alkyl and cyclohexyl, R² is selected from the group consisting of $C_{1-4}$ alkyl, $C_{3-4}$ alkenyl, chloro $C_{1-4}$ alkyl, benzyl and phenethyl, X is selected from the group consisting of nitro, phenyl, and $C_{1-2}$ alkylmercapto, Y is selected from the group consisting hydrogen, chloro, $C_{1-2}$ alkyl, and $n$ is 1 to 2.

4. The compound of claim 1 wherein such compound is O - (4 - methylthiophenyl) - S - n - propyl-N-methyl-phosphoro-amido-thiolate of the formula

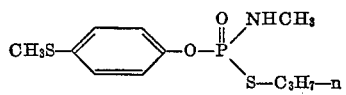

5. The compound of claim 1 wherein such compound is O - (4 - methylthio-phenyl)-S-n-butyl-N-isopropyl-phosphoro-amidothiolate of the formula

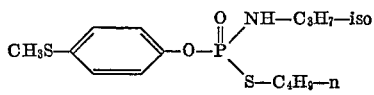

6. The compound of claim 1 wherein such compound is O - (4 - methylthio - phenyl) - S - n-butyl-N-sec.-butyl-phosphoro-amido-thiolate of the formula

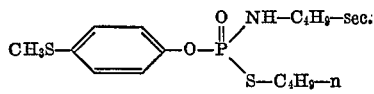

7. The compound of claim 1 wherein such compound is O - (3 - methyl - 4 - methylthio-phenyl)-S-n-propyl-N-methyl-phosphoroamido-thiolate of the formula

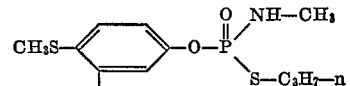

8. The compound of claim 1 wherein such compound is O - (3 - methyl - 4 - methylthio - phenyl) - S-benzyl-N-methyl-phosphoro-amido-thiolate of the formula

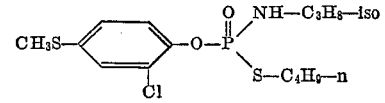

9. The compound of claim 1 wherein such compound is O - (2 - chloro - 4 - methylthio-phenyl) - S - n-butyl-N-isopropyl-phosphoro-amido-thiolate of the formula

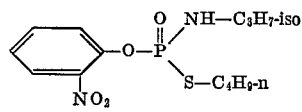

10. The compound of claim 1 wherein such compound is O - (2 - nitro - phenyl)-S-n-butyl-N-isopropyl-phosphoro-amido-thiolate of the formula

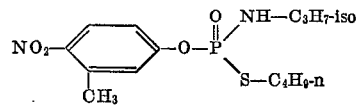

11. The compound of claim 1 wherein such compound is O - (3 - methyl - 4 - nitro - phenyl) - S-n-butyl-N-isopropyl-phosphoro-amido-thiolate of the formula

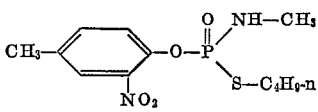

12. The compound of claim 1 wherein such compound is O - (2 - nitro - 4 - methyl-phenyl)-S-n-butyl-N-methyl-phosphoro-amido-thiolate of the formula

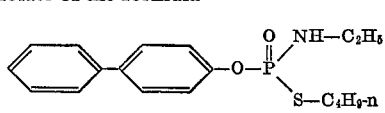

13. The compound of claim 1 wherein such compound is O - (4 - phenyl-phenyl)-S-n-butyl-N-ethyl-phosphoro-amido-thiolate of the formula

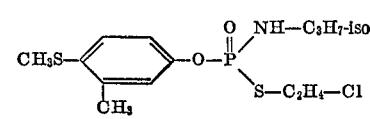

14. The compound of claim 1 wherein such compound is O - (3 - methyl - 4 - methylthio-phenyl)-S-2-chloro-ethyl-N-isopropyl-phosphoro-amido-thiolate of the formula

References Cited
UNITED STATES PATENTS

| | | | |
|---|---|---|---|
| 3,309,266 | 3/1967 | Magee | 260—959 X |
| 3,454,682 | 7/1969 | Haynes et al. | 260—956 |
| 3,644,600 | 2/1972 | Beriger | 260—959 |

LEWIS GOTTS, Primary Examiner

R. L. RAYMOND, Assistant Examiner

U.S. Cl. X.R.

260—954, 956, 957, 958, 959; 424—216, 218, 219, 220